(12) United States Patent
Dueckinghaus et al.

(10) Patent No.: US 7,464,525 B2
(45) Date of Patent: Dec. 16, 2008

(54) INTAKE CONVEYOR MECHANISM CONTROL FOR AN AGRICULTURAL WORKING MACHINE

(75) Inventors: Heinz Dueckinghaus, Bielefeld (DE); Norbert Strieker, Verl (DE); Thomas Rhody, Lichtenau (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 205 days.

(21) Appl. No.: 11/430,777

(22) Filed: May 9, 2006

(65) Prior Publication Data

US 2006/0254235 A1    Nov. 16, 2006

(30) Foreign Application Priority Data

May 13, 2005    (DE) .................. 10 2005 023 047

(51) Int. Cl.
*G01V 3/08*    (2006.01)
(52) U.S. Cl. ............... 56/10.2 J; 56/11.9; 56/DIG. 11
(58) Field of Classification Search ............ 56/10.2 R, 56/10.2 J, 10.5, 10.8, 10.9, 11.1, 11.3, 11.9, 56/DIG. 11, DIG. 15; 460/1–3; 60/489, 60/494

See application file for complete search history.

(56) References Cited

U.S. PATENT DOCUMENTS

| | | | | |
|---|---|---|---|---|
| 3,736,753 A | * | 6/1973 | Roth | ............................ 60/489 |
| 4,918,918 A | * | 4/1990 | Miki et al. | ..................... 60/489 |
| 5,325,670 A | * | 7/1994 | Iino | ............................ 60/468 |
| 6,324,822 B1 | * | 12/2001 | Oliva | ....................... 56/10.2 J |
| 6,397,570 B1 | * | 6/2002 | Bohrer et al. | ............. 56/10.2 J |
| 6,510,679 B2 | | 1/2003 | Krone et al. | |
| 6,564,549 B2 | * | 5/2003 | Nagura et al. | ................. 60/436 |
| 7,022,012 B2 | * | 4/2006 | Heinsey et al. | ................. 460/2 |
| 2001/0037638 A1 | | 11/2001 | Krone et al. | |
| 2003/0172638 A1 | * | 9/2003 | Ameye et al. | ............ 56/16.4 R |

FOREIGN PATENT DOCUMENTS

| | | |
|---|---|---|
| DE | 100 21 663 | 11/2001 |
| DE | 100 36 612 | 2/2002 |

* cited by examiner

*Primary Examiner*—Thomas B Will
*Assistant Examiner*—Mai T Nguyen
(74) *Attorney, Agent, or Firm*—Michael J. Striker

(57) ABSTRACT

An agricultural working machine has intake conveyor mechanisms, a hydraulic circuit via which the intake conveyor mechanisms are hydraulically driven and including at least one hydraulic motor which drives the intake conveyor mechanisms, at least one switching valve system for interrupting or releasing a flow of hydraulic oil being assigned to the at least one hydraulic motor, the switching valve system being configured for interrupting or releasing the flow of hydraulic oil to the hydraulic motor as a function of a signal from a foreign-object position detection device, the switching valve system including at least one braking function for the at least one hydraulic motor, and a section of the hydraulic circuit which realizes the at least one braking function is essentially free of elasticities.

25 Claims, 4 Drawing Sheets

INTAKE CONVEYOR MECHANISM CONTROL FOR AN AGRICULTURAL WORKING MACHINE

CROSS-REFERENCE TO A RELATED APPLICATION

The invention described and claimed hereinbelow is also described in German Patent Application DE 10 2005 023 047.4 filed on May 13, 2005. This German patent application, whose subject matter is incorporated here by reference, provides the basis for a claim of priority of invention under 35 U.S.C. 119 (a)-(d).

BACKGROUND OF THE INVENTION

The present invention relates to an agricultural working machine with intake conveyor mechanisms which are hydraulically driven via a hydraulic circuit.

A system of this type was made known in DE 100 36 612 A1, for example. According to that publication, the hydraulically-driven intake conveyor mechanisms—which are designed as intake rollers provided in pairs—convey a flow of crop material between them, the crop-material flow being transferred in the rear region to a crop-material chopping device, such as a chopper drum. Since the crop-material flow often contains foreign objects, such as metallic pieces or stones, which can cause serious damage to the chopper drum as it rotates at a high rate of speed, a "quick stop" function is assigned to the intake conveyor mechanisms. With the "quick stop" function, the foreign objects located in the crop-material flow are detected using a detection device, and, as a function of their detection, a shut-off signal for the intake conveyor mechanisms is generated in a control unit. To reliably prevent the detected foreign objects from reaching the chopper drum anyway after the intake conveyor mechanisms are shut off but continue to move, it is provided according to DE 100 36 612 A1 that a valve combination be assigned to the hydraulic drive of the intake conveyor mechanisms, the valve combination being composed of a main control valve and a pilot directional control valve, the foreign object detection device immediately triggering—when foreign objects are detected—a switching procedure at the pilot directional control valve that induces the quick stop. In addition to the large number of components required to realize the quick-stop function, a design of this type has the disadvantage that the various switching procedures and the distances that must be covered by the switching medium can delay the quick stop procedure such that the detected foreign object reaches the rotating chopper drum anyway, where it causes considerable damage.

The problem of inadequate reaction time is alleviated in the related art as disclosed, e.g., in DE 100 21 663 A1, by increasing the number of pairs of intake conveyor mechanisms, so that the length of the path traveled by the crop material through the intake conveyor mechanisms increases, thereby increasing the amount of time the crop material spends in the intake conveyor mechanisms. The interval of time that passes before the intake conveyor mechanisms come to a stop is therefore increased, thereby ensuring, with a greater level of reliability, that the foreign objects will be prevented from reaching the effective region of the rotating chopper drum. A design of this type has the disadvantage, however, that it would require a further, high-cost stage of intake rollers, which would also increase the amount of installation space required.

SUMMARY OF THE INVENTION

The object of the present invention, therefore, is to avoid the disadvantages of the related art described above, and to provide, in particular, a quick stop of the intake conveyor mechanisms when foreign objects are drawn in, with a minimum amount of components and installation space.

In keeping with these objects and with others which will become apparent hereinafter, one feature of the present invention resides, briefly stated, in an agricultural working machine, comprising intake conveyor mechanisms; a hydraulic circuit via which said intake conveyor mechanisms are hydraulically driven and including at least one hydraulic motor which drives said intake conveyor mechanisms; at least one switching valve system for interrupting or releasing a flow of hydraulic oil being assigned to said at least one hydraulic motor, said switching valve system being configured for interrupting or releasing the flow of hydraulic oil to said hydraulic motor as a function of a signal from a foreign-object position detection device, said switching valve system including at least one braking function for said at least one hydraulic motor, and a section of said hydraulic circuit which realizes said at least one braking function is essentially free of elasticities.

Due to the fact that the switching valve system according to the present invention includes at least one braking function for the at least one hydromotor, and the section of the hydraulic circuit which realizes the braking function is essentially free of elasticities, it is ensured that, when foreign objects are detected in the crop-material flow, it is possible to abruptly stop the intake and pre-compression rollers, since it is not necessary to overcome elasticity-related inertias.

A compact embodiment of the hydraulic circuit, according to the present invention, that has few components is attained when the switching valve system is capable of being operated in a "normal operation" operating state, and at least one "quick stop" operating state.

In an embodiment with a simple design, the switching valve system makes it possible, when in the "normal operation" operating state, for pressure to be applied to the motor and for the hydraulic medium to be purged.

A particularly advantageous embodiment of the present invention is attained when the switching valve system, when in the "quick stop" operating state, runs through a working cycle in which, in an initial step, the delivery of hydraulic medium to the hydromotor is at least partially interrupted, the purging of hydraulic medium is halted in a further step, and, in at least one third step, the hydromotor is braked. In this manner, the entire "quick stop" operating state is carried out using a single valve system.

The "quick stop" operating state is realized in a compact, effective manner having a simple design when the switching valve system is designed as a proportionally servo valve, the movement of the valve piston of which can be controlled via the control of at least two control cylinders.

To obtain a high degree of flexibility of control of the quick-stop function, it is advantageous—in an embodiment of the present invention—when the control cylinders can be controlled independently of each other.

In an advantageous refinement of the present invention, the valve piston that realizes the steps of the working cycle in the "quick stop" operating state includes a piston surface that is contacted on diametrically opposed sides by the cylinder surfaces of the at least two control cylinders. In this manner, the valve piston can be guided by the control cylinders in a reliable manner, using a simple design.

An efficient and rapid switching between the operating states is attained when one control cylinder is designed as a closing cylinder and is acted upon continually with a control pressure, the further control cylinder is designed as an opening cylinder, and the control pressure that can be applied to the further control cylinder can be switched on or off.

In an advantageous refinement of the present invention, the switching valve system is switched from the "normal operation" operating state to the "quick stop" operating state by switching off the control pressure of the further control cylinder.

To ensure that, once the main drive has been switched off, the after-running time of rotating working units, such as the chopper drum, can be reduced, a brake valve is assigned—in an advantageous embodiment of the present invention—to the hydraulic circuit in such a manner that the rotational motion of the hydropump and the working units operatively connected with it are braked.

Due to the extremely short reaction times required between the instant when a foreign object is detected and the triggering of the quick-stop function, an evaluation and control unit is assigned to the foreign-object detection device in a manner known per se, the evaluation and control unit generating, as a function of a position-detection signal X from foreign-object detection device, a quick-stop signal Y to switch the switching valve system to the "quick stop" operating state.

To ensure that the hydraulic circuit according to the present invention functions reliably in the "normal operation" operating state, and that the drive can be braked extremely quickly during the braking procedure in the "quick stop" operating state, in an advantageous embodiment of the present invention, the at least two control cylinders in the switching valve system are in a state of equilibrium in the "normal operation" operating state, and they are in a state of equilibrium for at least part of the time during execution of the third step in the working cycle of the switching valve system in the "quick stop" operating state.

In a manner having a simple design, the state of equilibrium between the control cylinders in the "normal operation" operating state can be achieved by using matched cylinder-surface designs of the control cylinders and/or by applying controlled pressures of the hydraulic medium to the control cylinders.

In an advantageous embodiment of the present invention, the state of equilibrium in the "quick stop" operating state is reliably maintained when, essentially at the end of the third step in the working cycle, the resultant pressure force of the pressurized control cylinder is in equilibrium with the reaction force, which is a function of the differential surface of the valve piston and a banking-up pressure which acts on the valve piston.

In a manner having a simple design, the first step in the working cycle of the proportionally servo valve according to the present invention is realized by assigning a by-pass piston to the closing cylinder, at least one by-pass bore of the by-pass piston opening a by-pass line while the valve piston moves— in the first step of the working cycle—via which at least a portion of the hydraulic medium flowing to the hydromotor is conducted away.

To ensure that nearly all of the hydraulic medium available in the hydraulic circuit according to the present invention can be used to realize abrupt braking in the "quick stop" operating state, i.e., to ensure that the hydraulic circuit always has the required accumulated pressure, it is possible, according to an advantageous embodiment of the present invention, to assign a return valve to the by-pass line such that the pressure source can supply the hydraulic circuit with hydraulic medium during the quick-stop procedure, while the return valve is closed during normal operation.

In an advantageous embodiment of the present invention, the valve piston has a restrictor which, in the second step of the working cycle, interrupts the connection between the working connection and an exchange portion of oil-channel. This has the advantage, in particular, that it is ensured, before the drive is braked, that all of the hydraulic medium available in the hydraulic circuit is available to realize the braking function.

To ensure that all of the hydraulic medium available in the hydraulic circuit is instantaneously available for realizing the braking function, the valve piston has restrictor slits on one end which, in the third step of the working cycle, close the return line from the hydromotor to the hydropump while the valve body is moving, the hydraulic medium being supplied subsequently by the hydropump, which creates a banking-up pressure for braking the hydromotors, the banking-up pressure preferably being within the range of the permissible operating pressure.

To ensure that pressure spikes and extreme accelerations are largely avoided in the hydraulic circuit according to the present invention, and, therefore, that stress-related wear is minimized, in an advantageous refinement of the present invention, a large number of restrictor points is assigned to the valve piston such that the passage cross-section exposed to the hydraulic medium changes continually as a function of the path traveled by the valve piston.

To ensure that the end regions of the control cylinders do not impact the particular stops unbraked and at a high rate of speed, in a further advantageous embodiment of the present invention, control edges and/or restrictor points are assigned to the at least two control cylinders such that the motion of the valve piston is braked in the end regions.

To ensure that the drive according to the present invention has a compact, space-saving shape and is also free of elasticities, such as long hose lines, in an advantageous refinement of the present invention, the hydromotor, hydropump, the switching valve system and switching valves required to control the hydromotor, hydropump and switching valve system in the "normal operation" and "quick stop" operating states are all located in a drive block which forms the drive of the intake conveyor mechanisms.

A high degree of flexibility in the design of the drive in the normal, quick stop and reversing operation for the intake and pre-compression rollers, and the cross auger component of the front attachment located in front of the intake and pre-compression rollers is achieved when the intake conveyor mechanisms are coupled with at least one mechanical transfer gearbox, the input shaft of which is coupled with the hydraulic drive (13), the mechanical transfer gearbox also including a further gearbox outlet, and the further gearbox outlet being coupled with the cross auger component of the front attachment.

DESCRIPTION OF THE PREFERRED EMBODIMENTS

DESCRIPTION OF THE PREFERRED EMBODIMENTS

Figure 1:
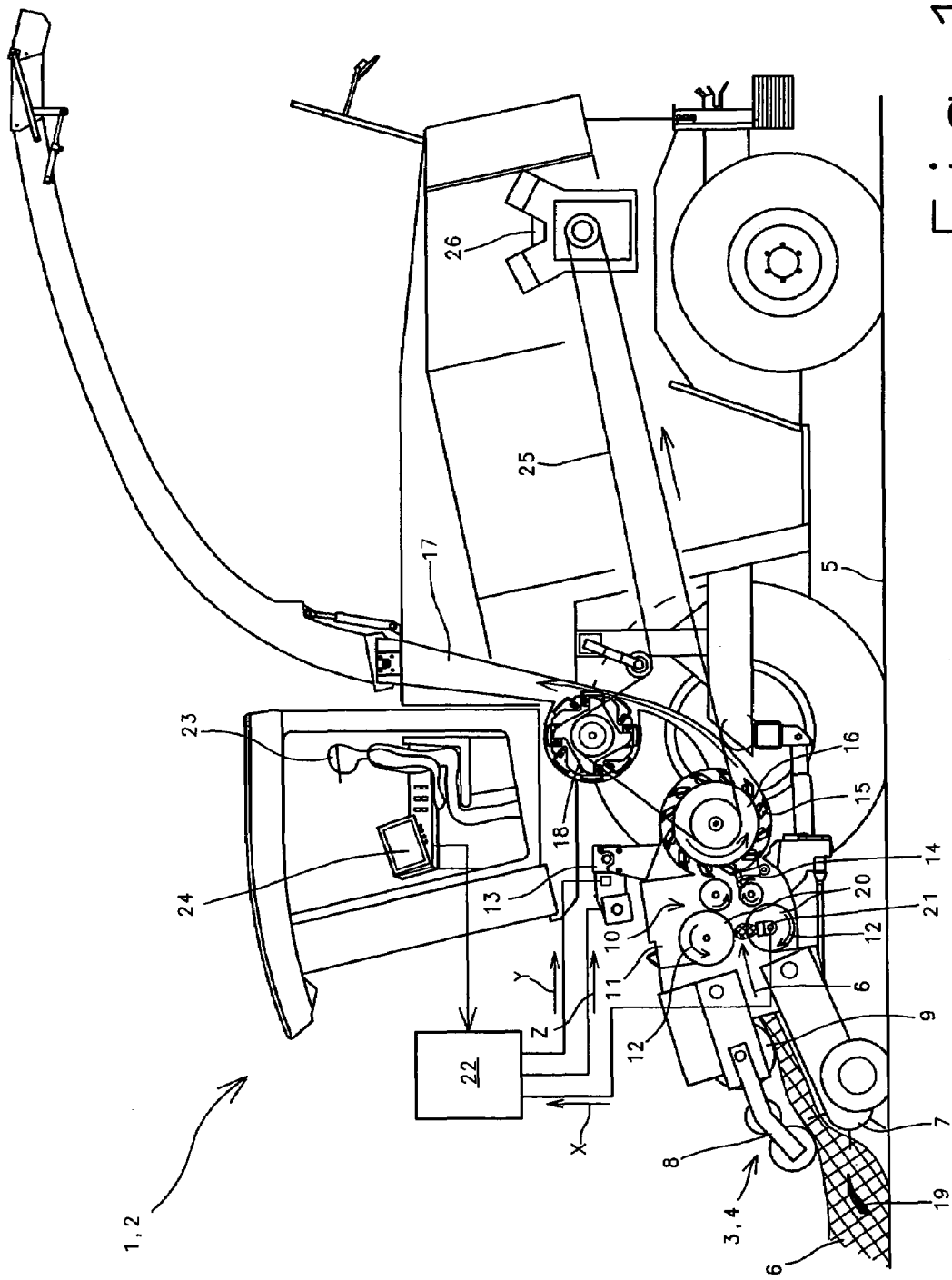
FIG. 1 shows an agricultural working machine with a drive according to the present invention, in a schematic side view

FIG. 1 shows an agricultural working machine 1 designed as a self-propelled forage harvester 2, to the front region of which a front attachment 3 designed as a pick-up 4 is assigned. In the exemplary embodiment shown, front attachment 3 picks up a crop-material strand 6 lying on ground 5 using a pick-up device 7, compresses it using a hold-down system 8, and subsequently guides crop-material strand 6 via a cross auger component 9 to intake and pre-compression rollers 10 located downstream of front attachment 3. Intake and pre-compression rollers 10 are retained, in pairs, in a feeder housing 11. In a manner known per se, the pairs of intake and pre-compression rollers 10 are driven actively in the direction of arrow 12 using a drive 13 to be described below in greater detail. In the rear region of feeder housing 11 located above a shear bar 14, compressed crop-material strand 6 enters the working region of cutter blade 15 of an actively driven, rotating chopper drum 16. Chopped crop-material strand 6 subsequently exits the rear region of chopper drum at a high rate of speed and enters a rising lower discharge chute 17, in which crop-material strand 6 is conveyed, using a "post-accelerator" 18 in some cases, out of forage harvester 2 to a forage vehicle, which is not shown. To largely prevent foreign objects 19 located in crop-material strand 6 from coming close to chopper drum 16, a foreign-object detection device 12 known per se is assigned to intake roller pair 20 located on the front. If foreign object 19 located in crop-material strand 6 is conveyed into the vicinity of foreign-object detection device 21, it generates a position-detection signal X, which is supplied to an evaluation and control unit 22 and, in this, generates a "quick stop" signal Y that switches off drive 13 (to be described below in greater detail) of intake and pre-compression rollers 10. When the quick-stop procedure has ended, operator 23 of agricultural working machine 1 can trigger, via an input terminal 24, a reversing signal Z in evaluation and control unit 22, which triggers a reversing operation of drive 13 and intake and pre-compression rollers 10 coupled with it. Detected foreign object 19 can be conveyed out of the vicinity of intake and pre-compression rollers 10 and can eventually be removed from crop-material strand 6 by operator 23. An automatic triggering of the reversing procedure described above after intake and pre-compression rollers 10 come to a standstill also lies within the scope of the present invention.

Depending on the inertia of drive 13 and the units coupled thereto, a certain amount of time passes until intake and pre-compression rollers 10 come to a standstill after the quick-stop function has been activated. This length of time must not be so great that detected foreign object 19 reaches the vicinity of rotating chopper drum 16 anyway. The present invention, which is described in detail below, takes effect at this point.

Figure 2:
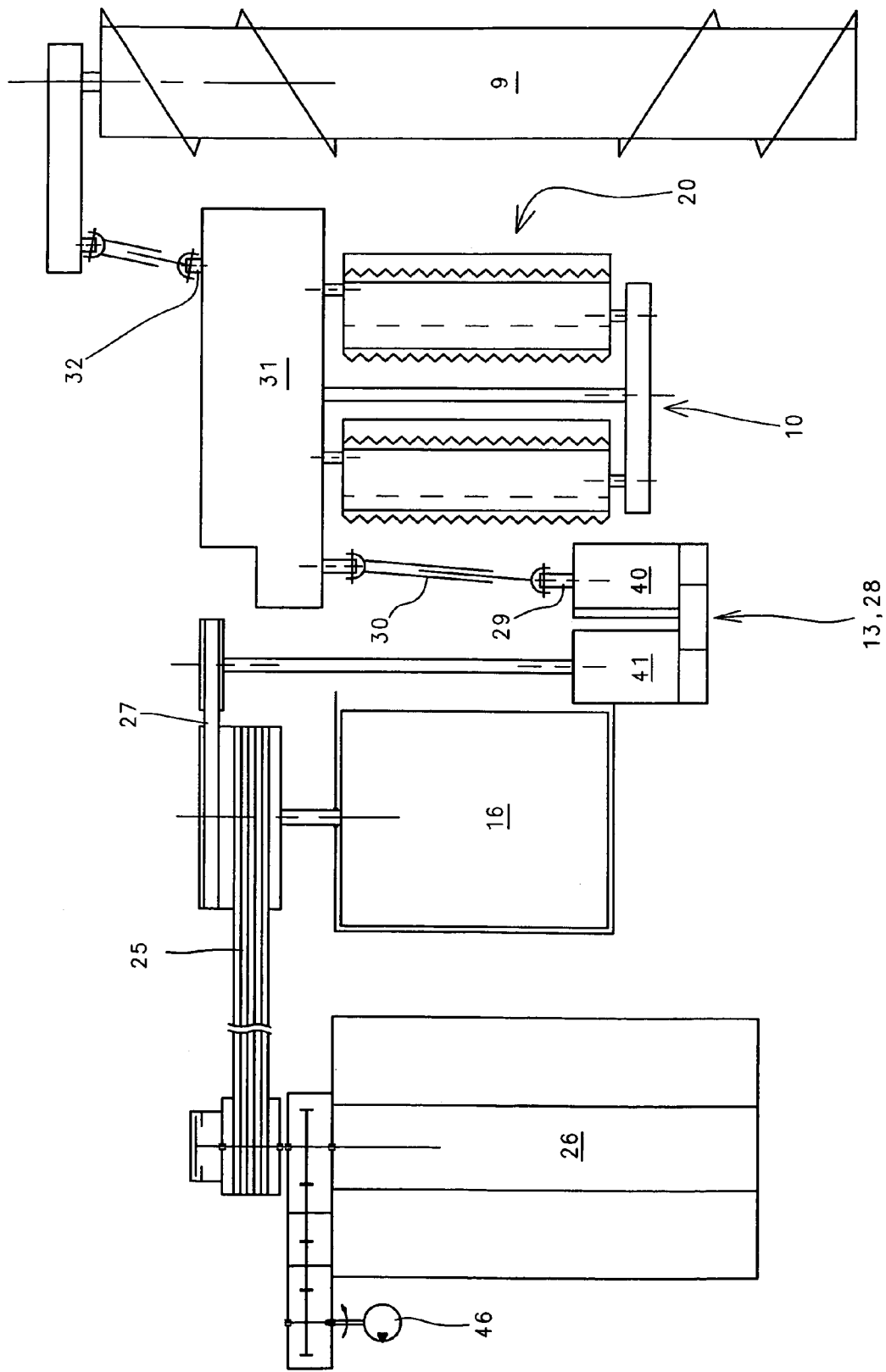
FIG. 2 shows a detailed view of the drive according to the present invention in FIG. 1

According to FIG. 2, a first drive-belt system 25 transfers the drive energy of motor 26 to chopper drum 16, among other things, from which a further belt system 27 drives a hydraulic motor-pump unit 28, which ultimately forms stepless hydraulic drive 13 of intake and pre-compression rollers 10. For this purpose, a mechanical transfer gearbox 31 is assigned to output shaft 29 of motor-pump unit 28 via a universal drive shaft 30, mechanical transfer gearbox 31 initially driving each of the intake and pre-compression rollers 10 in a manner known per se. In addition, transfer gearbox 31 includes a further gearbox outlet 32, which directly drives cross auger component 9 of front attachment 3 located in front of intake and pre-compression rollers 12. This has the advantage, in particular, that cross auger component 9 of front attachment 3 can now also be integrated in the quick-stop function (which will be described in greater detail, below) and in the reversing procedure of intake and pre-compression rollers 10. In a manner known per se, the rest of the actively driven units 7, 8 of particular front attachment 3 are driven via a further mechanical drive, which is not shown.

Figure 3:
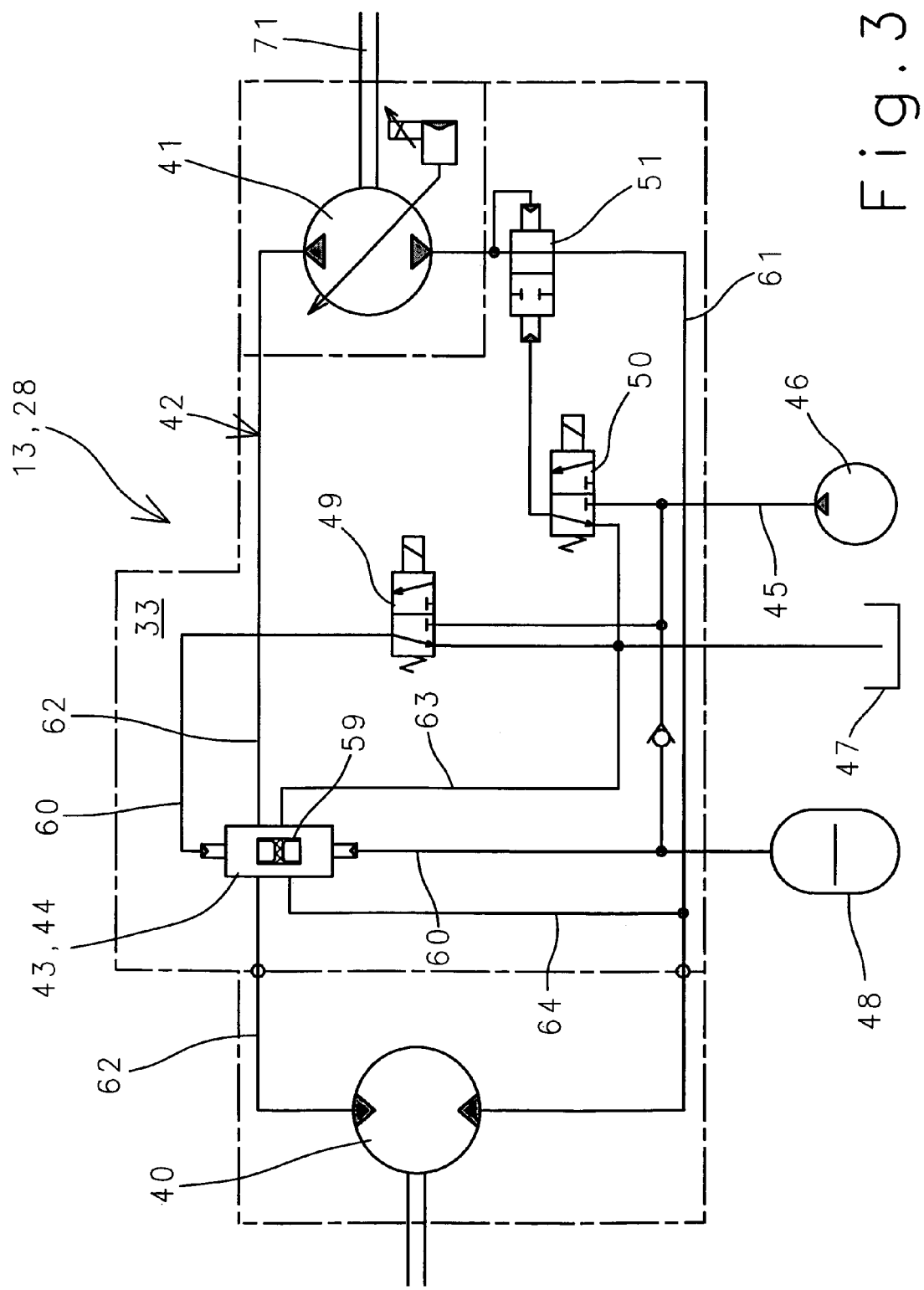
FIG. 3 shows a schematic illustration of the hydraulic circuit that is the drive according to the present invention

FIG. 3 shows motor-pump unit 28 in a schematic, detained illustration. Hydromotor 40 and hydropumpe 41 are interconnected via a line system 42 in which switching valve system 44, according to the present invention, designed as proportionally servo valve 43 is integrated. Motor-pump unit 28 is also integrated in a hydraulic circuit 45 that includes a hydraulic pump 46 designed as a pressure source in a manner known per se, a tank 47 for storing the hydraulic medium, and a pressure reservoir 48. Due to available external pressure source 46, hydraulic circuit 45 functions as a constant-pressure circuit in a manner known per se. Further electrohydraulic switching valves 49-51 integrated in hydraulic circuit 45 and the mode of operation of hydraulic circuit 45 are described in greater detail with reference to the simplified, longitudinal sectional drawing of switching valve system 44 according to the present invention, in FIG. 4.

To ensure that hydraulic circuit 45 according to the present invention can enable an abrupt halt of intake conveyor mechanisms designed as intake and pre-compression rollers 10, at least hydromotor 40, hydropump 41 and required switching valves 43, 49-51 are all located in a drive block 33 which forms drive 13, individual elements 40, 41, 43, 49-51 of hydraulic circuit 45 being interconnected directly using flanges and/or via a piping network. In addition, switching valves 43, 49-51 of hydraulic circuit 45 are switched in an electrohydraulic manner. A design of this type has the advantage, in particular, that no hose lines or valve controls based on the use of spring force are located, at the least, in the region of hydraulic circuit 45 that realizes the braking of drive 13, the elastic properties of the hose lines and/or valve controls—e.g., the pressure-dependent expansion of hose lines and the inertia of systems based on the use of spring force—would stand in the way of an abrupt braking of drive 13 of intake and pre-compression rollers 10.

Figure 4:
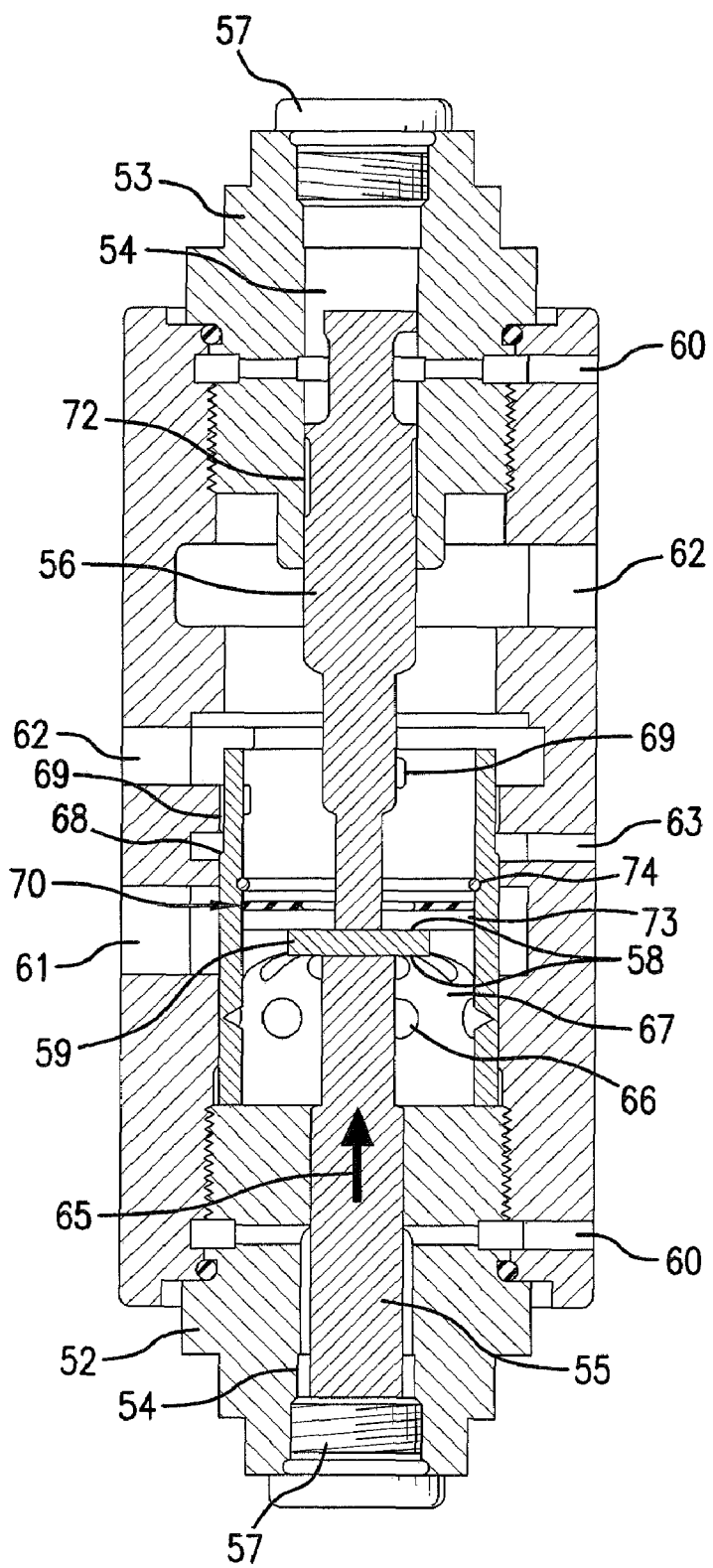
FIG. 4 shows a detailed longitudinal sectional view of the valve system according to the present invention

Proportionally servo valve 43 according to the present invention, as shown in FIG. 4, has housing sections 52, 53 at its ends, which are penetrated by bores 54 in which control cylinders 55, 56 are displaceably located, the movement of control cylinders 55, 56 being limited by terminal stops 57. On their end faces, which face each other, control cylinders 55, 56 accommodate a piston surface 58 between them, via which a displacement of control cylinders 55, 56 also results in a displacement of valve piston 59 inside proportionally servo valve 43.

In this first operating state, i.e., "normal operation", control cylinders 55, 56 are acted upon, independently of each other, in their rear regions via control-pressure lines 60 with a defined control pressure, which holds valve piston 59 state of equilibrium as shown in FIG. 4. In this state of equilibrium, the circulation of the hydraulic medium between hydromotor 40 and hydropump 41 is closed. The hydraulic medium is pumped to hydromotor 40 via a pressure line 61, and is returned via a return line 62, then it is pumped back to hydromotor 40 by hydropumpe 41. At the same time, a partial quantity of the hydraulic medium is removed from circulation via an exchange portion of oil-channel 63 to be cooled and/or filtered. It is within the scope of the present invention for the equilibrium between control cylinders 55, 56 to be realized using matched cylinder-surface designs or by applying pressure to control cylinders 55, 56 using controlled oil pressures.

The "normal operation" operating state is maintained until a foreign object 19 is detected at the foreign-object detection device 21, quick-stop signal Y is generated in evaluation and control unit 22, and the system switches to the "quick stop" operating state. Quick-stop signal Y causes quick-stop switching valve 49 assigned to proportionally servo valve 43 to be switched to the position shown in FIG. 3. In this position, upper control cylinder 56 is depressurized by removing the hydraulic medium via pressure line 60 and quick-stop switching valve 49 assigned thereto and directing it into tank 47. In the "quick stop" operating state, upper control cylinder 56 functions as an opening cylinder. In the "quick stop" operating state, lower control cylinder 55, which is also pressurized, functions as a closing cylinder and moves valve piston 59 in the direction of arrow 65 using proportionally servo valve 43 according to the present invention.

In its front region assigned to piston surface 58 of valve piston 59, lower control cylinder 55 accommodates a by-pass piston 66, which is penetrated by by-pass bores 67.

In a first step, the motion of lower control cylinder 55 displaces by-pass piston 66 into the region of pressure line 61 leading to hydromotor 40. The hydraulic medium by-passes hydromotor 40 via a by-pass line 64 and returns to hydropump 41, causing the supply of pressurized hydraulic medium to hydromotor 40 to be interrupted, which also causes hydromotor 40 to be shut off. In a further step, the continued motion of valve piston 59 in the direction of arrow 65 closes exchange portion of oil-channel 63 via a restrictor 68 integrally moulded on valve piston 59, thereby preventing additional hydraulic medium from being conducted away via exchange portion of oil-channel 63. Once exchange portion of oil-channel 63 has been closed completely, the continued motion of valve piston 59 in the direction of arrow 65 brings about an abrupt braking of hydromotor 40, therefore bringing intake and pre-compression rollers 10 to a standstill by the fact that valve piston 59 closes return line 62 from hydromotor 40 to hydropump 41. Since hydropump 41 continues to pump hydraulic medium to hydromotor 40, but hydraulic medium can no longer flow out, a banking-up pressure abruptly forms in pressure line 61 to hydromotor 40, which abruptly halts hydromotor 40 and intake and pre-compression rollers 10 coupled therewith.

To ensure that the rising banking-up pressure does not overload the units it acts upon, the end of valve piston 59 assigned to control cylinder 56 functioning as an opening cylinder is penetrated by restrictor slits 69, via which the excess hydraulic medium can flow out of motor return line 62.

Optimally, restrictor slits 69, control cylinders 55, 56 and valve piston 59 are sized such that a banking-up pressure is created which is in the range of the operating pressure of hydraulic circulation and is preferably 350 bar. The motion of closing cylinder 55 in the direction of arrow 65 also results in a continual shrinking of the passage cross-section of restrictor slit 69. The differential surface of valve piston 59 is sized such that valve piston 59 with the pressurized closing cylinder 55 is in a state of equilibrium when the banking-up pressure has reached a defined value, e.g., 350 bar in the exemplary embodiment shown. It is thereby ensured, in a simple manner, that the braking function will be reliably maintained.

In an advantageous refinement of the present invention, a return valve 70 is assigned to valve piston 59 of proportionally servo valve 43 according to the present invention in the form of a sealing disk 73, which is capable of being moved by the hydraulic medium. Sealing disk 73 is located, in a freely movable manner, between the piston surface of valve piston 59 contacted by control cylinders 55, 56 and a set collar 74 fit into valve piston 59, and is pressed against set collar 74 or valve piston 59, depending on the direction of flow of the hydraulic medium. Return valve 70 is closed in the "normal operation" operating state, since the hydraulic medium flowing back from hydromotor 40 to hydropump 41 via return line 62 applies pressure to sealing disk 73 in the direction of the piston surface of valve piston 59 and, therefore, in the closing direction. In the "quick stop" operating mode, hydropump 46, which functions as a pressure source, pumps a pressure-oil flow in the opening direction of return valve 70—sealing disk 73 bearing against set collar 74 in the opening direction—thereby ensuring that the control-oil flow produced by hydropump 46 during the "quick stop" operating mode reaches hydraulic circuit 45 according to the present invention, thereby ensuring that the accumulated pressure is also maintained in hydraulic circuit 45 during the braking procedure.

In a further advantageous embodiment of the present invention, a brake valve 51 designed as an electrohydraulic switching valve can also be assigned to hydropump 41, which brakes a chopper drum 16 coupled with hydropump 41 via an external drive 71 after the drive of chopper drum 16 is shut off. The main effect of this is that long after-running times of shut-off chopper drum 16 are prevented. The braking function can be triggered, e.g., by the fact that pressure-source switching valve 50 switches brake valve 51 via a control pressure into the locked position, thereby blocking the rotational motion of hydropump 41 and abruptly braking chopper drum 16 until it comes to a standstill.

In a further advantageous embodiment, a restrictor cross section 72 is assigned, on the top side, to control cylinder 56 designed as an opening cylinder, via which the hydraulic medium displaced by control cylinder 56 is conducted away. As a result, control cylinder 56 is braked before it reaches stop 57 assigned to it and allows it to come to rest against stop 57 in a non-abrupt manner.

It will be understood that each of the elements described above, or two or more together, may also find a useful application in other types of constructions differing from the types described above.

While the invention has been illustrated and described as embodied in an intake conveyor mechanism control for an agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural working machine, comprising intake conveyor mechanisms; a hydraulic circuit via which said intake conveyor mechanisms are hydraulically driven and including at least one hydraulic motor which drives said intake conveyor mechanisms; at least one switching valve system for interrupting or releasing a flow of hydraulic oil being assigned to said at least one hydraulic motor, said switching valve system being configured for interrupting or releasing the flow of hydraulic oil to said hydraulic motor as a function of a signal from a foreign-object position detection device, said switching valve system including at least one braking function for said at least one hydraulic motor, and a section of said hydraulic circuit which realizes said at least one braking function is essentially free of elasticities and wherein said switching valve system is configured as a proportional servo valve, in which motion of valve pistons is controllable via triggering of at least two control cylinders.

2. An agricultural working machine as defined in claim 1, wherein said switching valve system is configured so that it is operatable in a "normal operation" operating state, and in at least one "quick stop" operating state.

3. An agricultural working machine as defined in claim 2, wherein said switching valve system is configured so that when in the "normal operation" operating state, said switching valve system enables pressure to be applied to said hydraulic motor and enables a hydraulic medium to be purged.

4. An agricultural working machine as defined in claim 2, wherein said switching valve system is configured so that when in the "quick stop" operating state, said switching valve system runs through a working cycle, in which in an initial step, a delivery of hydraulic medium to said hydraulic motor is at least partially interrupted, a purging of the hydraulic medium is halted in a further step, and in at least one third step said hydraulic motor is braked.

5. An agricultural working machine as defined in claim 1, wherein said control cylinders are configured so as to be triggered independently of each other.

6. An agricultural working machine as defined in claim 1, wherein said control cylinders have cylinder surfaces assigned to diametrically opposed piston surfaces of said valve piston.

7. An agricultural working machine as defined in claim 1, wherein one of said control cylinders is configured as a closing cylinder and is acted upon continually by a controlled pressure.

8. An agricultural working machine as defined in claim 7, wherein said control cylinders have a further control cylinder which is configured as an open cylinder, and a control pressure applicable to said further control cylinder is switchable on or off.

9. An agricultural working machine as defined in claim 8, wherein said further control cylinder is configured so that when the control pressure applied to said further control cylinder is switched off, said switching valve system is switched from a "normal operation" operating state to a "quick stop" operating state.

10. An agricultural working machine as defined in claim 1; and further comprising a brake valve assigned to a hydraulic circuit such that a rotational motion of said hydraulic pump is brakeable.

11. An agricultural working machine as defined in claim 1; and further comprising an evaluation and control unit which is assigned to said foreign-object detection device, and as a function of a position-detection signal received from said foreign-object detection device, generates a quick-stop signal to switch said switching valve system to the "quick stop" operating state.

12. An agricultural working machine as defined in claim 4, wherein at least two control cylinders of said switching valve system are in a state of equilibrium in the "normal operation" operating state, and said at least two control cylinders are in a state of equilibrium at least part of a time during execution of said third step in a working cycle of said switching valve system in the "quick stop" operating state.

13. An agricultural working machine as defined in claim 12, wherein the state of equilibrium in the "normal operation" operating state is realized using matched cylinder-surface designs of said control cylinders and/or by applying controlled pressures of a hydraulic medium to said control cylinders.

14. An agricultural working machine as defined in claim 12, wherein the equilibrium of said control cylinders in the "quick stop" operating state is provided essentially at an end of said third step in said working cycle when a resultant pressure force of a pressurized control cylinder is an equilibrium with a reaction force which is a function of a differential surface of a valve piston and a banking-up pressure which acts on a valve piston.

15. An agricultural working machine as defined in claim 7; and further comprising a by-pass piston assigned to said closing cylinder and having at least one by-pass bore opening by a by-pass line while, in a first step of the working cycle, a valve piston moves, and at least a portion of hydraulic medium flowing to said hydraulic motor is conducted away via said by-pass line.

16. An agricultural working machine as defined in claim 15; and further comprising a return valve assigned to said bypass line and closing said by-pass line.

17. An agricultural working machine as defined in claim 1, wherein a valve piston of said switching valve system has a restrictor that, in a second step of a working cycle interrupts a connection between a working connection and an exchange portion of oil channel while said valve piston moves.

18. An agricultural working machine as defined in claim 1, wherein said switching valve system has a valve piston having a restrictor slit on one end that, in a third step of said working cycle closes a return line from said hydraulic motor to a hydraulic pump while said valve piston moves, a hydraulic medium supplied subsequently by said hydraulic pump creating a banking-up pressure for braking said hydraulic motor.

19. An agricultural working machine as defined in claim 18, wherein said hydraulic pump is configured so that the banking-up pressure is within a range of permissible operating pressures.

20. An agricultural working machine as defined in claim 1, wherein said switching valve system has a valve piston; and further comprising a large number of restrictor points assigned to said valve piston in a manner such that a passage cross-section is exposed to hydraulic medium changes continually as a function of a path traveled by said valve piston.

21. An agricultural working machine as defined in claim 20, wherein said switching valve system has at least two control cylinders; and further comprising elements selected from the group consisting of control edges, restrictor points, and both and assigned to said at least two control cylinders such that a motion of a valve piston of said switching valve system is braked in end regions.

22. An agricultural working machine as defined in claim 3, wherein said hydraulic motor, a hydropump provided for said hydraulic motor, said switching valve system and switching valves required to control said hydraulic motor, at least in the "normal operation" and "quick stop" operating states, are located in a drive block which forms a drive of intake conveyor mechanisms.

23. An agricultural working machine as defined in claim 22, wherein said intake conveyor mechanisms are coupled with at least one transfer gear box having an input shaft coupled to a hydraulic drive, wherein said mechanical transfer gear box also includes a further gear box outlet.

24. An agricultural working machine as defined in claim 23, wherein said further gear box outlet is coupled with a cross auger component of a front attachment located in front of said intake conveyor mechanisms.

25. An agricultural working machine as defined in claim 22, wherein said drive is configured so that it is operatable in a reversing mode.

* * * * *